(12) United States Patent
Kim

(10) Patent No.: US 6,549,761 B1
(45) Date of Patent: Apr. 15, 2003

(54) RADIO FREQUENCY TRANSMISSION CONTROL APPARATUS FOR PREVENTING OSCILLATION IN WIDEBAND WIRELESS LOCAL LOOP TERMINAL

(75) Inventor: Cheul-Hong Kim, Seoul (KR)

(73) Assignee: Hyundai Electronics Industries Co., Ltd., Kyonggi-Do (KR)

( * ) Notice: Subject to any disclaimer, the term of this patent is extended or adjusted under 35 U.S.C. 154(b) by 0 days.

(21) Appl. No.: 09/518,400

(22) Filed: Mar. 3, 2000

(30) Foreign Application Priority Data

Mar. 4, 1999 (KR) .............................................. 99-7124

(51) Int. Cl.[7] .............................................. H04B 1/40
(52) U.S. Cl. ......................................... 455/127; 455/75
(58) Field of Search .............................. 455/76, 78, 77, 455/75, 127, 114, 573, 305, 524

(56) References Cited

U.S. PATENT DOCUMENTS 5,001,776 A  *  3/1991  Clark .......................... 455/343
5,031,231 A  *  7/1991  Miyazaki .................... 455/574
5,831,548 A     11/1998 Fitzgibbon
5,953,646 A  *  9/1999  Hirasawa .................... 455/343

* cited by examiner

Primary Examiner—Edward F. Urban
Assistant Examiner—Naghmeh Mehrpour
(74) Attorney, Agent, or Firm—Bryan Cave LLP

(57) ABSTRACT

A radio frequency transmission control apparatus for preventing an oscillation in a wideband wireless local loop terminal has a radio frequency transmitting unit for modulating a baseband transmitting signal to a WLL radio frequency band signal and transmitting the modulated signal via an antenna, and the radio frequency transmitting unit is divided into a radio frequency converting unit and a power amplifier unit in accordance with characteristics of each active element constituting the radio frequency transmitting unit. When a power is supplied to the radio frequency transmitting unit, the power is first supplied to the radio frequency converting unit so as to maintain the same at an operating state. After a predetermined time period has elapsed, the power is supplied to the power amplifier unit. When the radio frequency transmitting unit is cut off from a power, a cutoff of the power amplifier unit is performed prior to a cutoff of the radio frequency converting unit, to thereby prevent generation of an oscillation frequency in W-WLL terminal.

5 Claims, 4 Drawing Sheets

RADIO FREQUENCY TRANSMISSION CONTROL APPARATUS FOR PREVENTING OSCILLATION IN WIDEBAND WIRELESS LOCAL LOOP TERMINAL

BACKGROUND OF THE INVENTION

1. Field of the Invention

The present invention relates to a radio frequency processing apparatus of a wideband wireless local loop (W-WLL), and more particularly, to a radio frequency transmission control apparatus for preventing oscillation in a W-WLL terminal, in which power supply is controlled in accordance with characteristics of each active element of radio frequency transmitter unit in the W-WLL terminal, to thereby eliminate an oscillation caused by a simultaneous power supply to the radio frequency processing apparatus and minimize power consumption.

2. Description of the Related Art

FIG. 1 is a block diagram illustrating a radio frequency processing apparatus of a common W-WLL terminal.

Referring to FIG. 1, the radio frequency processing apparatus includes a radio frequency receiving unit 20 for demodulating an WLL radio frequency band signal received via an antenna to a baseband signal so as to be processed in a modem; a radio frequency transmitting unit 40 for modulating the baseband signal to a WLL radio frequency band signal and transmitting the modulated signal via an antenna; a local clock generating unit 30 for generating a local clock to be used in the radio frequency receiving unit 20 and radio frequency transmitting unit 40; and a BBM (baseband module) interface unit 50 for matching among a BBM for performing a signal processing in a W-WLL terminal, the radio frequency receiving unit 20 and radio frequency transmitting unit 40.

Referring to FIG. 2, the radio frequency receiving unit 20 further includes a power switch unit (VCC switch unit) 60 for controlling a power supply to operate the radio frequency receiving unit 20 in accordance with a control of the BBM interface unit 50; an LNA (low noise amplifier) 20a for reducing a noise in a signal output from an antenna duplex 10 and amplifying the noise-reduced signal; an RF BPF (radio frequency band pass filter) 20b for performing a band pass filtering to a radio frequency signal output from the LNA 20a; an LNA 20c for performing a low-noise amplification to the signal that has passed the RF BPF 20b; an RF BPF 20d for performing a band pass filtering to the signal that has passed the LNA 20c; a down-mixer 20e for mixing up the local clock generated from the local clock generating unit 30 and the signal that has passed the RF BPF 20d and generating an IF (intermediate frequency); an IF BPF (intermediate frequency radio frequency band pass filter) 20f for performing a band pass filtering to the signal that has passed the down-mixer 20e; an automatic gain control amplifier AGC IF 20g for converting an automatic control voltage in accordance with a level of the signal output from the IF BPF 20f so as to maintain an output signal at a regular level; an adder 20j for generating an automatic control voltage so as to maintain a signal output from the modem of W-WLL terminal at a regular level and providing the AGC IF 20g with thus-generated automatic control voltage; an IF amplifier 20k for amplifying a signal output from the AGC IF 20g; a demodulator 20l for demodulating a signal output from the IF amplifier 20k using the local frequency output from the local clock generating unit 30; and a data buffer 20m for buffering a signal output from the demodulator 20l and outputting the result to the BBM interface unit 50.

Thus-configured radio frequency receiving unit of a common W-WLL terminal operates as follows.

The BBM (digital signal processing apparatus of W-WLL RIU (radio interface unit) outputs a control signal RX_ON for power supply of the radio frequency receiving unit 20 and a gain control PDM signal of the local clock generating unit 30. Thus, the VCC switch unit 60 supplies power to each component constituting the radio frequency receiving unit 20, and the local clock generating unit 30 generates a local RF and local IF.

A forward channel RF signal transmitted from a W-WLL radio port is received via an antenna and input to the antenna duplex 10. Then, the antenna duplex 10 eliminates signals existing in an area excluding an applied bandwidth, and transmits the result to the LNA 20a.

The LAN 20a amplifies the signal according to a supporting standard, and transmits the result to the RF BPF 20b. The RF BPF 20b has a bandwidth of 30 MHz, filters only a signal of bandwidth of 30 MHz, and transmits the result to the LNA 20c. The LNA 20c reduces noise of the input signal, amplifies the same, and transmits the same to the RF BPF 20d. The RF BPF 20d performs a filtering to enhance a noise figure, and outputs the result to the down-mixer 20e.

The down-mixer 20e receives local RF (radio frequency higher than the received RF by the amount of IF) output from the RF VCO (voltage-controller oscillator) 30c of the local clock generating unit 30, and mixes the local RF with the signal output from the RF BPF 20d, to thereby generate an intermediate frequency (IF). This IF is for a conversion to a baseband.

The IF BPF 20f passes, among IFs output from the down-mixer 20e, only the bandwidth corresponding to the band of the processed signal of a modem of W-WLL terminal, and suppresses signals existing outside of the band and in the adjacent channel.

The AGC IF 20g has a unique gain control scope according to characteristics of component, and changes gain control voltage according to the input signal level, thus maintaining output signal at a regular level. The gain control signal is output from a modem.

The signal output from the AGC IF 20g is amplified in the IF amplifier 20k, and transmitted to the demodulator 20l. The demodulator 20l receives local IF output from the IF VCO 30e of the local clock generating unit 30. Using such a local IF, output signal of the IF amplifier 20k is demodulated by a QPSK (quadrature phase shift keying) method. I-signal and Q-signal which are demodulated to a baseband are buffered in the data buffer 20m and output to the BBM interface unit 50.

FIG. 3 illustrates configuration of a common radio frequency transmitting unit which operates as follows.

The radio frequency transmitting unit 40 modulates I-signal and Q-signal of the baseband transmitted from the BBM interface unit 50 to a QPSK signal, and converts the same to an RF signal using local RF signal and local IF signal. Then, the RF signal is amplified using a power amplifier 40k, and emitted via an antenna.

A power switch unit 70 of the radio frequency transmitting unit 40 supplies/cuts off power to/from each component of the radio frequency transmitting unit 40 in accordance with a power control signal output from the BBM interface unit 50. That is, when TXON signal in a high-active state is output from the BBM interface unit 50, the power switch unit 70 supplies power all over the active element of the radio frequency transmitting unit 40 through a single power supply line (TX_VCC) connected to the radio frequency transmitting unit 40.

When each active element of the radio frequency transmitting unit 40 is thus-provided with a power through the line (TX_VCC), an overload problem may occur. Further, an additional problem may occur in that the radio frequency transmitting unit 40 outputs an undesired oscillation frequency while I-signal (TX_I) and Q-signal (TX_Q) output from the BBM interface unit 50 are transmitted to the power amplifier 40k, i.e., the final amplifier, via the data buffer 40a. That is, the radio frequency transmitting unit 40 has an oscillation when a power switching is performed, thus deteriorating Eb/No value of RF module transmitting output. In addition, such an oscillation may reduce capacity of the radio port when a wireless communication is performed.

During the delay time period until the transmitting signals are sequentially input from the data buffer 40a, that is, during the time period where the operation of the power amplifier 40k is not required, the power amplifier 40k which ranks highest power consumption among active components of the radio frequency transmitting unit 40 operates, which may result in a power loss.

Further, the radio frequency transmitting unit 40 is turned off after the power amplifier 40k has finished outputting of the transmitting RF. Thus, other active elements except the power amplifier 40k may consume unnecessary power.

SUMMARY OF THE INVENTION

Therefore, it is an object of the present invention to provide a radio frequency transmission control apparatus for preventing an oscillation in a wideband wireless local loop terminal in which power supply is controlled in accordance with characteristics of each active element of radio frequency transmitter unit in the W-WLL terminal so as to thereby eliminate an oscillation caused by a simultaneous power supply to the radio frequency processing apparatus and minimize power consumption.

To accomplish the above object of the present invention, there is provided a radio frequency transmission control apparatus for preventing an oscillation in a wideband wireless local loop terminal, the apparatus has a radio frequency transmitting unit for modulating a baseband transmitting signal to a WLL radio frequency band signal and transmitting the modulated signal via an antenna, and which is divided into a radio frequency converting unit and a power amplifier unit in accordance with characteristics of each active element constituting the radio frequency transmitting unit. When a power is supplied to the radio frequency transmitting unit, the power is first supplied to the radio frequency converting unit so as to maintain the same at an operating state. After a predetermined time period has elapsed, the power is supplied to the power amplifier unit. When the radio frequency transmitting unit is cut off from a power, a cutoff of the power amplifier unit is performed prior to a cutoff of the radio frequency converting unit, to thereby prevent generation of an oscillation frequency in W-WLL terminal.

BRIEF DESCRIPTION OF THE DRAWINGS

The present invention will become more fully understood from the detailed description given hereinafter accompanying drawings, which are given by way of illustration only, and thus are not limitative of the present invention, and wherein.

DETAILED DESCRIPTION OF A PREFERRED EMBODIMENT

The present invention will be explained in more detail with reference to the attached drawings.

Figure 1:
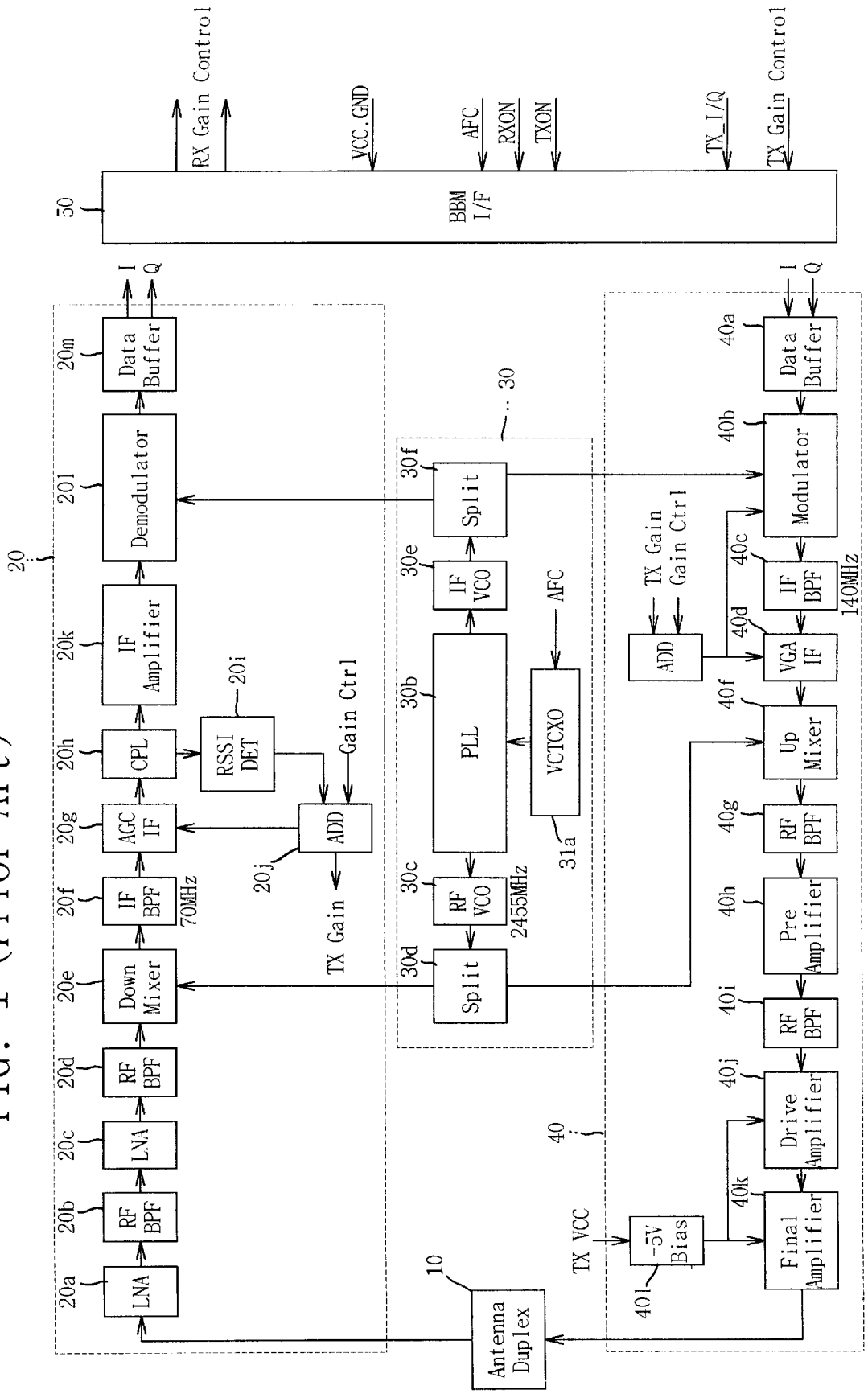
FIG. 1 is a block diagram illustrating a radio frequency processing apparatus of a conventional W-WLL terminal.
Figure 2:
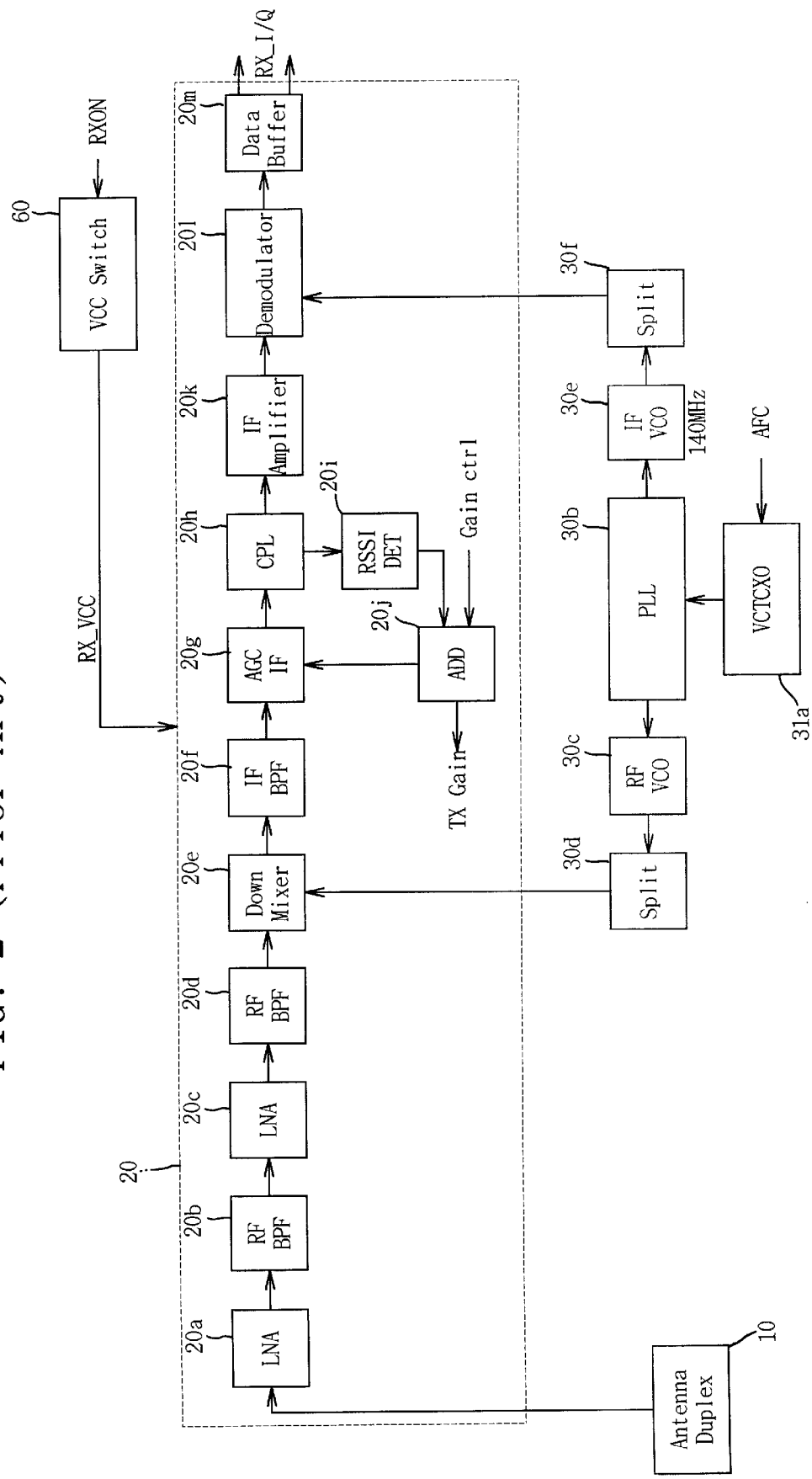
FIG. 2 is a block diagram illustrating a radio frequency receiving unit of the apparatus shown in FIG. 1.
Figure 3:
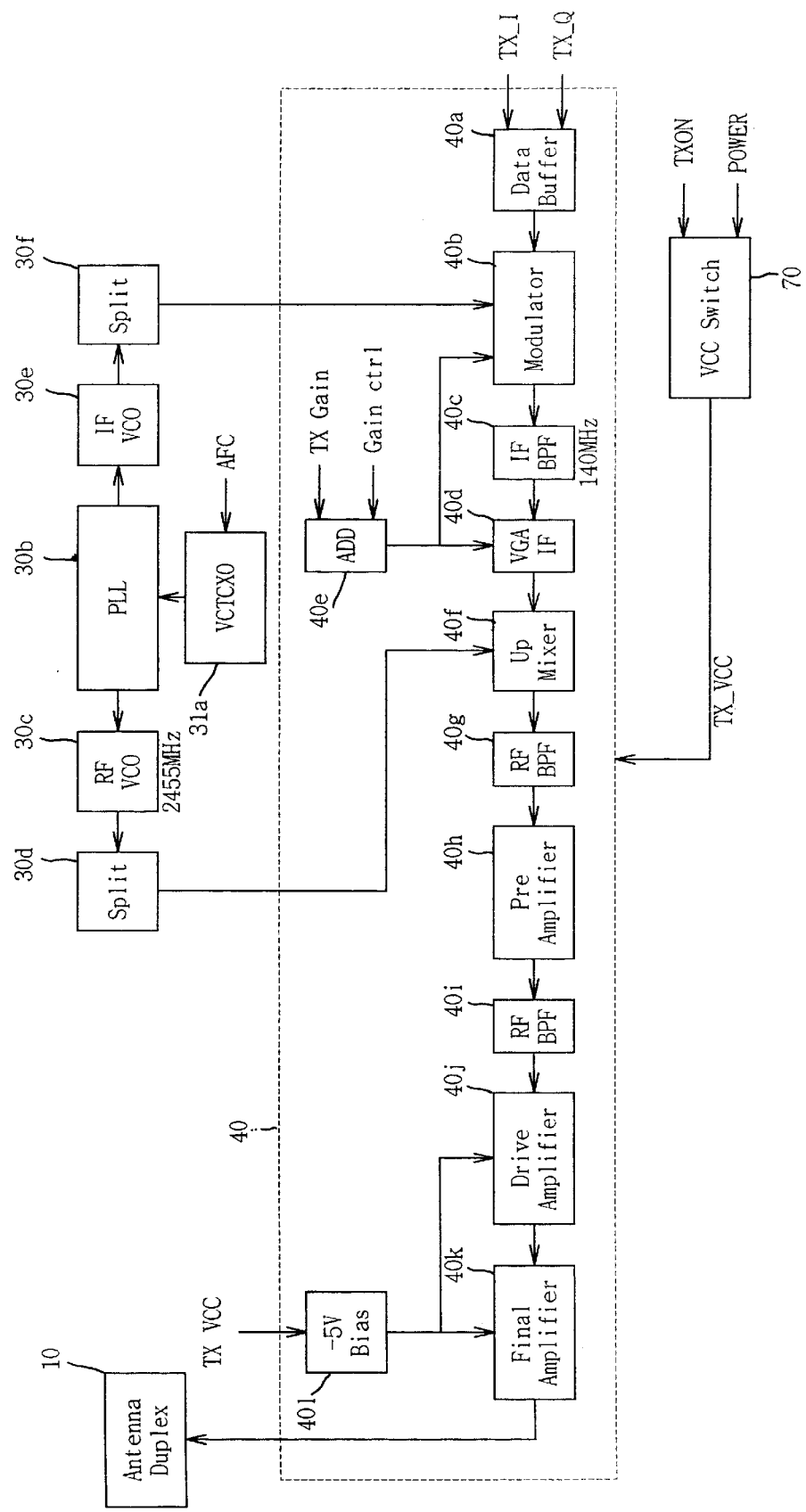
FIG. 3 is a block diagram illustrating a radio frequency transmitting unit of the apparatus shown in FIG. 1.
Figure 4:
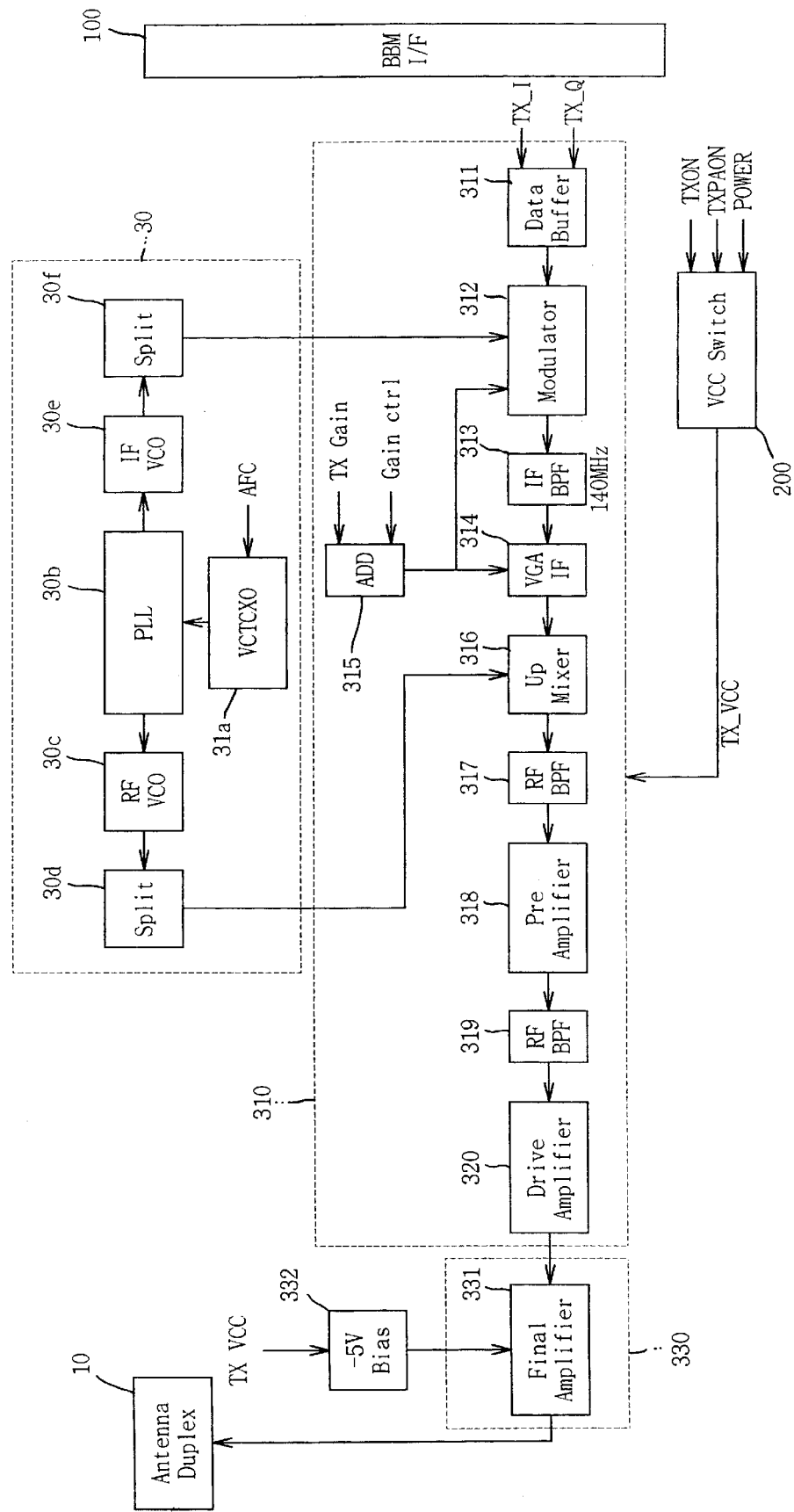
FIG. 4 is a block diagram illustrating a radio frequency transmission control apparatus for preventing an oscillation in W-WLL terminal according to the present invention.

Referring to FIG. 4, a BBM interface 100 is matched to the BBM for processing a digital signal of W-WLL terminal, and transmits I-signal (TX_I), Q-signal (TX_Q) and a signal for power supply control to the radio frequency transmitting unit which is divided into a radio frequency converting unit 310 and a power amplifier unit 330.

The local clock generating unit 30 has a configuration same as that of the local clock generating unit included in a conventional radio frequency transmitting unit or radio frequency receiving unit. That is, the local clock generating unit 30 includes a reference clock generating unit (VCTCXO) 30a for generating a reference clock having a voltage/thermal sensitivity according to a control of the BBM connected to the BBM interface 100; an RF VCO (voltage controlled oscillator) 30c for generating a local RF using an output signal of the VCTCXO 30a; an IF VCO 30e for generating a local IF using an output signal of the VCTCXO 30a; and a PLL (phase locked loop) 30b for maintaining a synchronization among the VCTCXO 30a, RF VCO 30c, and IF VCO 30e.

The VCC switch 200 supplies a power to the radio frequency converting unit 310 and power amplifier unit 330 in accordance with a signal for controlling a power supply to the radio frequency converting unit 310 and a signal for controlling a power supply to the power amplifier unit 330, both signals transmitted from the BBM interface 100.

The radio frequency converting unit 310 includes a data buffer 311 for buffering I-signal and Q-signal transmitted from the BBM interface 100; a modulator 312 for generating an IF by modulating a signal output from the data buffer 311 using a local IF generated from the local clock generating unit 30; an IF BPF 313 for performing a band pass filtering onto an IF output from the modulator 312; an adder 315 for adding a transmission gain control signal (TX Gain Control) transmitted from the BBM interface 100 and a gain (TX Gain) of a transmitting terminal; an automatic gain control amplifier VGA IF 314 for amplifying a signal output from the IF BPF 313 by the amount added by the adder 315; an up-mixer 316 for generating an RF by mixing the local RF signal generated from the local clock generating unit 30 and an IF signal output from the automatic gain A control amplifier VGA IF 314; an RF BPF 317 for band pass filtering the RF output from the up-mixer 316; a pre-amplifier 318 for amplifying a signal output from the RF BPF 317; and an RF BPF 319 for band pass filtering a signal output from the pre-amplifier 318.

The power amplifier unit 330 is made up of a final amplifier 331 which amplifies power level of an RF so that the RF output from the radio frequency converting unit 310 is emitted.

Thus-configured radio frequency transmission control apparatus for preventing an oscillation of W-WLL terminal of the present invention operates as follows.

Here, operation of the radio frequency transmitting unit is omitted because it is the same as that of a conventional one.

Power on/off method of the radio frequency transmitting unit for preventing an oscillation can be explained as follows.

First, the power amplifier 331 which ranks highest power consumption and is arranged at the end of the radio frequency transmitting unit is isolated from other active elements constituting the radio frequency transmitting unit. Therefore, the radio frequency transmitting unit is divided into the power amplifier unit 330 made up of the power amplifier and radio frequency converting unit 310 made up of other active elements.

The BBM controls power supply separately for the radio frequency converting unit 310 and power amplifier unit 330. That is, the BBM generates a signal for controlling a power supply of the high frequency converting unit 310 and a signal for controlling a power supply of the power amplifier unit, respectively. A power supply line between the power switch 200 and radio frequency converting unit 310 and a power supply line between the power switch 200 and the power amplifier unit 330 are separated, to thereby supply/cut off a power in accordance with a switching operation of the power switch 200.

When I-signal and Q-signal are transmitted via an antenna after the radio frequency transmitting unit is supplied with a power, the BBM outputs control signal TXON as an active state via the BBM interface 100 so as to supply a power to the radio frequency converting unit 310. After a predetermined time period elapses, control signal TXPAON for a supply of a power to the power amplifier unit 330 is output as an active state. Here, the predetermined time period ranges over a process where the signal transmitted from the radio frequency converting unit 310 is input, processed by each active element, and output to the power amplifier unit 330. That is, the predetermined time period is those required for processing I-signal and Q-signal in the radio frequency converting unit 31.

The power switch 200 supplies a power to the radio frequency converting unit 310 via TX_VCC by the prior activated TXON signal. Then, the radio frequency converting unit 310 operates first so that each active element 311 to 320 may turn to an operating state in order to process a transmitting signal. Subsequently, a power is supplied to the power amplifier unit 330 via TX_PA_VCC by the activated TXPAON signal.

As described above, the radio frequency transmitting unit is divided into two portions so as to avoid simultaneous power supply and an overload. The power amplifier unit 330 does not consume power until a normal RF signal is input, thus preventing an undesired oscillation frequency.

When the radio frequency transmitting unit is cut off from a power, the BBM outputs inactive state TXPAON to the VCC switch 200 via the BBM interface unit 100, and subsequently inactive state TXON, too. Thus, the VCC switch unit 200 cuts off power supply via TX_PA_VCC, so that the power amplifier unit 330 may not output any undesired oscillation frequency. The radio frequency converting unit 310 is cut off from a power via TX_VCC so as to cut off a power of the radio frequency transmitting unit.

A radio frequency transmission control apparatus for preventing an oscillation in W-WLL terminal of the present invention can be applied to an RF module in a wireless communication system as well as an RF transmitting unit of a radio frequency processing apparatus in W-WLL terminal.

As described above, the present invention is advantageous in that a power supply is controlled by dividing the radio frequency transmitting unit into the radio frequency converting unit and power amplifier unit according to the characteristic of active element, thus reducing a power consumption and preventing an oscillation. As a result, Eb/No value of the radio frequency transmitting unit is enhanced so as to thereby improve a service quality and a capacity of a radio port.

While the present invention shown and described has been characterized as being preferred, it will be obvious that various changes and modifications can be made therein without departing from the spirit and scope of the invention as defined in the following claims.

What is claimed is:

1. A radio frequency transmission control apparatus for preventing an oscillation in a wideband wireless local loop (W-WLL) terminal, wherein said apparatus comprising a radio frequency receiving unit for demodulating an WLL radio frequency band signal received via an antenna to a baseband signal so as to be processed in a modem; a radio frequency transmitting unit for modulating said baseband signal to a WLL radio frequency band signal and transmitting the modulated signal via an antenna; a local clock generating unit for generating a local clock to be used in said radio frequency receiving unit and radio frequency transmitting unit; and a BBM (baseband module) interface unit for matching among said BBM for performing a baseband signal processing in said W-WLL terminal, said radio frequency receiving unit and said radio frequency transmitting unit, wherein said apparatus comprising a BBM interface unit for transmitting a power control signal for a radio frequency converting unit and a power control signal for a power amplifier unit, both signals transmitted from said BBM, so that a power supply to said radio frequency transmitting unit is controlled, dividing said radio frequency transmitting unit into said radio frequency converting unit and said power amplifier unit in accordance with characteristics of active elements constituting said radio frequency transmitting unit; and a power switch unit for preventing an oscillation by supplying or cutting off a power, dividing said radio frequency transmitting unit into said radio frequency converting unit and said power amplifier unit, in accordance with said power control signal for said radio frequency converting unit and said power control signal for said power amplifier unit, both signals transmitted from said BBM interface unit.

2. A radio frequency transmission control apparatus for preventing an oscillation in a wideband wireless local loop (W-WLL) terminal according to claim 1, wherein said radio frequency converting unit further comprises:

a data buffer for buffering I-signal and Q-signal transmitted from said BBM interface unit; a modulator for generating an IF (intermediate frequency) by modulating a signal output from said data buffer using a local IF generated from said local clock generating unit; an IF BPF (band pass filter) for performing a band pass filtering onto an IF output from said modulator; an adder for adding a gain control signal transmitted from said BBM interface unit and a gain of a transmitting terminal; an automatic gain control amplifier for amplifying a signal output from said IF BPF by the amount added by said adder; an up-mixer for generating an RF by mixing a local RF (radio frequency) signal generated from said local clock generating unit and an IF signal output from said automatic gain control amplifier; an RF BPF (band pass filter) for band pass filtering said RF output from said up-mixer; a pre-amplifier for amplifying a signal output from said RF BPF; and an RF BPF for band pass filtering a signal output from said pre-amplifier.

3. A radio frequency transmission control apparatus for preventing an oscillation in a wideband wireless local loop (W-WLL) terminal according to claim 1, wherein said power amplifier unit is made up of a power amplifier which amplifies power level of an RF so that said RF output from said radio frequency converting unit is emitted.

4. A radio frequency transmission control apparatus for preventing an oscillation in a wideband wireless local loop (W-WLL) terminal according to claim 1, wherein said power switch unit performs a switching operation for supplying a power to said radio frequency converting unit and, after a predetermined time period has elapsed, performs another switching operation for supplying a power to said power amplifier unit, and performs a switching operation for cutting off a power from said power amplifier unit and, after a predetermined time period has elapsed, performs another switching operation for cutting off a power from said radio frequency converting unit.

5. A radio frequency transmission control apparatus for preventing an oscillation in a wideband wireless local loop (W-WLL) terminal according to claim 2, wherein said predetermined time period ranges over a process where a signal to be transmitted via an antenna is input to said radio frequency converting unit, processed, and input to said power amplifier unit.

* * * * *